United States Patent [19]

Haren et al.

[11] 4,212,327
[45] Jul. 15, 1980

[54] POLYMERIC HOSE

[75] Inventors: Doyle V. Haren, Clyde; William M. Edwards, Waynesville, both of N.C.

[73] Assignee: Dayco Corporation, Dayton, Ohio

[21] Appl. No.: 956,762

[22] Filed: Nov. 1, 1978

[51] Int. Cl.³ .......................................... F16L 11/04
[52] U.S. Cl. .................................... 138/125; 138/145; 138/DIG. 1
[58] Field of Search ............... 138/125, 126, 130, 132, 138/137, 141, DIG. 1, 144, 145, 118, 118.1

[56] References Cited

U.S. PATENT DOCUMENTS

| 1,844,324 | 2/1932 | Kennedy | 138/125 X |
|---|---|---|---|
| 2,053,112 | 9/1936 | Schnabel | 138/137 |
| 2,564,602 | 8/1951 | Hurst | 138/125 |
| 2,755,535 | 7/1956 | Schoenberger | 138/125 |
| 2,800,145 | 7/1957 | Pecerls et al. | 138/125 X |
| 3,116,760 | 1/1964 | Matthews | 138/125 |
| 3,506,515 | 4/1970 | Robinson et al. | 138/125 X |
| 3,575,123 | 4/1971 | Shepherd | 138/145 |
| 3,805,848 | 4/1974 | Chrow | 138/137 |
| 3,866,632 | 2/1975 | Schaffer | 138/125 X |
| 3,905,398 | 9/1975 | Johonsen et al. | 138/125 X |
| 4,048,362 | 9/1977 | Moring et al. | 138/125 X |

Primary Examiner—Richard E. Aegerter
Assistant Examiner—James E. Bryant, III
Attorney, Agent, or Firm—Reuben Wolk; Charles E. Bricker

[57] ABSTRACT

A polymeric hose and method of making same are provided wherein such hose comprises an inner base tube, a reinforcing braid made of aramid yarn disposed concentrically around the base tube with the aramid yarn having great affinity for water, a cover tube disposed concentrically around the reinforcing braid, and a moisture-impervious tubular film disposed between the braid and cover tube with the film isolating the aramid yarn and resulting in a tubular zone between the braid and cover tube free of water moisture created bubbles.

4 Claims, 3 Drawing Figures

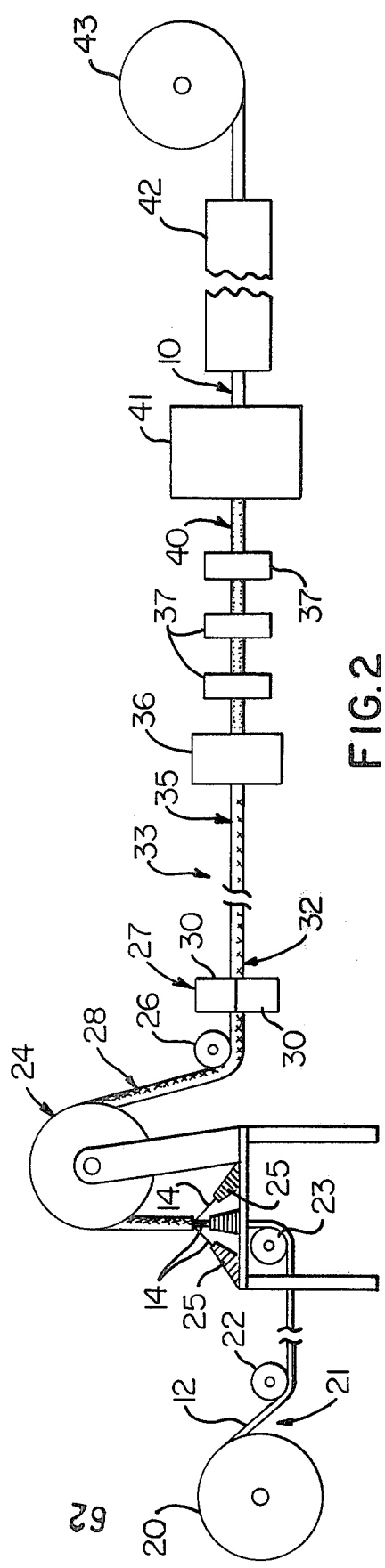
FIG. 2
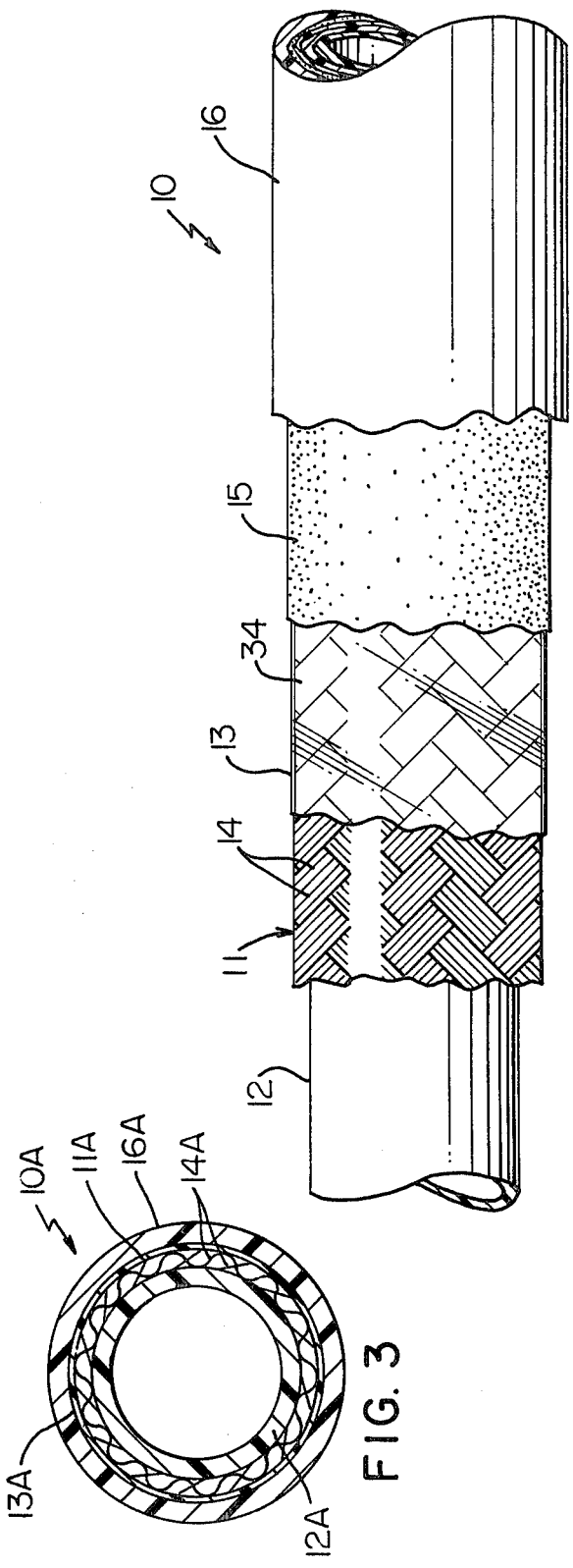
FIG. 1
FIG. 3

POLYMERIC HOSE

BACKGROUND OF THE INVENTION

1. Field of the Invention

This invention relates to a flexible hose made primarily of polymeric material and to a method of making the same.

2. Prior Art Statement

It is known in the art to provide a hose made primarily of polymeric material and comprised of an inner base tube, a tubular braided reinforcing layer or reinforcing braid made of aramid yarn disposed concentrically around the base tube, and a polymeric cover tube disposed by extrusion process concentrically around the reinforcing braid. Because the aramid yarn of the reinforcing braid has a great affinity for water, previously proposed polymeric hose have water moisture created bubbles at the interface of the cover tube and reinforcing braid resulting in corresponding void spaces between the reinforcing braid and cover tube and thus a hose of comparatively poor quality.

Various techniques have been proposed to solve this problem such as drying of the braided aramid yarn in a suitable oven or heat tunnel immediately before extruding the cover tube thereover; however, these techniques have not been entirely successful and even with some practical use of prior drying of the braided aramid yarn there is a tendency for water moisture to collect on the braid causing bubbles on the tubular zone between the reinforcing braid and cover tube. If the drying times and/or temperatures are substantially increased there is often permanent damaging distortion of the inner base tube.

It has also been proposed to provide a plastisol adhesive against the braided aramid yarn followed by suitably curing such adhesive as with fire rings and with the plastisol adhesive still in a hot condition a polymeric cover tube is extruded against the reinforcing braid. However, even with this approach, the great affinity of the aramid reinforcing braid for water causes beading of water droplets in the tubular zone between such braid and cover tube and the formation of bubbles in such zone.

SUMMARY

It is a feature of this invention to provide a hose made primarily of polymeric material and having a braided reinforcing layer made of aramid yarn and a cover tube made of a polymeric material with a tubular zone between such braid and cover tube free of water moisture created bubbles.

Another feature of this invention is to provide a polymeric hose of the character mentioned employing a moisture-impervious tubular film disposed around such braided layer to isolate such layer therewithin.

Another feature of this invention is to provide a polymeric hose of the character mentioned in which the moisture impervious film is an ambient air temperature dried film made of an acrylic latex.

Another feature of this invention is to provide a polymeric hose of the character mentioned in which the moisture impervious tubular film is made of polymeric material capable of being applied in liquid form and upon drying solidifies to define a tubular structure.

Another feature of this invention is to provide a polymeric hose comprising an inner base tube, a reinforcing braid made of aramid yarn with the aramid yarn having great affinity for water, a polymeric cover tube disposed concentrically around the reinforcing braid, and a moisture-impervious tubular film disposed between the braid and cover tube with the tubular film isolating the aramid yarn and resulting in a tubular zone between the braid and cover tube free of water moisture created bubbles.

Another feature of this invention is to provide a hose of the character mentioned with an adhesive layer disposed between such reinforcing braid and cover tube yet with the moisture-impervious tubular film disposed between the braid and adhesive layer and serving to isolate the aramid yarn.

Another feature of this invention is to provide the method of making a polymeric hose of the character mentioned.

Therefore, it is an object of this invention to provide an improved polymeric hose and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a view with parts in elevation, parts in cross-section, and parts broken away illustrating one exemplary embodiment of a polymeric hose of this invention;

FIG. 2 is a primarily schematic presentation with parts in elevation and parts broken away illustrating the method and associated apparatus employed in making the polymeric hose of FIG. 1; and FIG. 3 is a cross-sectional view illustrating another exemplary embodiment of a polymeric hose of this invention which is similar to the hose of FIG. 1.

DESCRIPTION OF ILLUSTRATED EMBODIMENTS

Reference is now made to FIG. 1 of the drawing which illustrates one exemplary embodiment of a hose of this invention which is made primarily of polymeric material, and thus will be referred to as a polymeric hose, and such hose is designated generally by the reference numeral 10. The polymeric hose 10 has a braided tubular layer 11 made of aramid yarn yet such hose is substantially free of water moisture created bubbles of the type which plague previously proposed hose of this type and wherein such bubbles in previous hose are disposed in a tubular zone between the reinforcing braid of aramid yarn of such hose and an adjoining layer disposed concentrically around such braid.

The polymeric hose 10 comprises an inner base tube 12 made of a suitable polymeric material preferably in the form of a synthetic plastic material and the tube 12 may be defined in accordance with any suitable technique or process known in the art such as by extrusion process, for example, whereby the tube 12 may be a seamless tube. The base tube 12 has the braided reinforcing layer or reinforcing braid 11 braided against the outside surface of such tube and as will be described in detail subsequently and has a moisture impervious tubular film 13 bonded against the braid 11 and such film extends into the interstices between individual yarns 14 of the braid. The tubular film 13 is what will be referred to as an ambient air temperature dried film, i.e., such film is applied in liquid form and dried by exposing a length of the hose construction comprised of base tube 12 and reinforcing braid 11 with the tubular film 13 thereagainst to normal ambient temperatures and without special heating or cooling and while continuously processing the overall hose construction. The dried and solidified film 13 is effective in isolating the aramid yarn 13 disposed therebeneath.

The polymeric hose 10 also has an adhesive layer such as a cured layer of plastisol adhesive 15 disposed against the tubular film 13. A polymeric cover tube 16 is disposed concentrically around the entire construction and against the outside surface of the plastisol adhesive layer 15 and the cover tube 16 is preferably formed by extrusion against layer 15.

It is known in the art that aramid yarn has great affinity for water and in previously proposed hose of this type which do not employ moisture-impervious film such as tubular film 13 there is a tendency for the aramid yarn of any reinforcing braid to attract water moisture even through any adhesive layer disposed concentrically therearound and such moisture tends to build-up and form water beads in the area or tubular zone between the reinforcing braid and the inside surface of any polymeric cover tube extruded therearound.

However, with the utilization of the moisture-impervious tubular film 13 as taught by this invention there is no tendency for water moisture to collect and any water moisture created bubbles which might be produced are prevented from forming.

Having described the polymeric hose 10, reference is now made to FIG. 2 of the drawing for a detailed presentation of the method of this invention used in making such hose. As indicated earlier, the base tube 12 is preferably made as a seamless tube by extrusion process; and, in this disclosure such tube is shown wound on a supply roll 20 thereof which is suitably supported for unwinding rotation. However, it will be appreciated that, if desired, the base tube 12 may be provided in a continuous process directly from an extruder and after moving of the hot extruded tube 12 through a cooling chamber it may be provided so that it is introduced essentially at location 21 upstream of a suitable turn roll 22.

After movement of the base tube 12 around turn roll 22 it is moved around another turn roll 23 and is then passed through a braiding machine or braider 24 for braiding of the reinforcing braid 11 around base tube 12. The braider 24 is of known construction and has a plurality of spools 25 each of which carries a length of aramid yarn 14 and the yarns 14 are braided concentrically around and against the outside surface of the base tube 12 to define the reinforcing braid 11 as a tubular reinforcing braid.

The base tube 12 with the reinforcing braid 11 braided concentrically therearound defines a hose construction 28 which is moved around a turn roll 26 to a film applying station designated generally by the reference numeral 27 where the moisture impervious film 13 is disposed in tubular form as a latex film or coating against the outside surface of the reinforcing braid 11. Although any suitable technique may be employed in applying the tubular film 13, such film is preferably applied employing a pair of so-called film wiping gaskets each designated by the same reference numeral 30 with each gasket 30 being saturated with a suitable liquid such as a latex which solidifies upon drying to define the film 13. The gaskets are saturated using any technique known in the art and such gaskets 30 have inside contours which conform to the outside configuration of the reinforcing braid 11 so that the hose construction 28 may be continuously moved through the film applying station 27 and a coating of material defining the film continuously applied to define a hose construction 32 having wet or undried film thereon.

The liquid latex defining the tubular film 13 is preferably dried at ambient air temperatures in a drying zone indicated at 33 and this is achieved by merely continuing the hose construction process while exposing a substantial length of the construction 32 to normal ambient temperatures and such substantial length is preferably of the order of 12 meters and greater. The 12 meter length of exposed construction is provided while processing the hose construction at the usual processing speeds provided by a conventional braider 24 whereby drying is achieved in a few minutes. Once dried a hose construction 35 is defined and the film 13 thereof has a substantially smooth right circular cylindrical outside surface 34 (FIG. 1) and some of the tubular film 13 has portions extending into the interstices between individual yarns 14 of the reinforcing braid 11.

The hose construction 35 is then coated with a plastisol adhesive at an adhesive applying station 36 and the plastisol adhesive is cured preferably employing a plurality of fire rings each designated by the same reference numeral 37 and shown schematically as rectangular blocks to define an adhesive coated hose construction 40. The cover tube 16 is then extruded concentrically around and against the plastisol adhesive layer 15 of the hose construction employing an extrusion apparatus such as a crosshead extruder 41 and while the construction 40 is still hot whereupon the hose construction 10 is defined and exits the crosshead extruder 41. The hose construction is then moved through a cooling tank or chamber 42 of conventional construction for cooling; and, the completed and cooled hose construction is then wound to define a supply roll 43 thereof.

The above-described technique provides tubular film 13 which effectively isolates the reinforcing braid 11 defined by braided aramid yarn 14 and results in a tubular zone between the braid 11 and the cover tube 16 which is free of water moisture created bubbles. It should also be emphasized that the plastisol adhesive layer 15 alone would not be adequate in isolating the aramid yarn 14 defining the reinforcing braid 11 whereby the hose of this invention and the method of making such hose are unique due to the fact that the moisture impervious tubular film 13 isolates the aramid yarn in the manner described.

Another exemplary embodiment of the hose of this invention is illustrated in FIG. 3 of the drawing. The hose of FIG. 3 is very similar to the hose 10; therefore, such hose will be designated by the reference numeral 10A and representative parts of the hose 10A which are similar to corresponding parts of the hose 10 will be designated in the drawing by the same reference numeral as in the hose 10 followed by the letter designation "A" and not described again in detail.

The hose 10A of FIG. 3 is very similar to hose 10 with the exception that the layer of plastisol adhesive is eliminated. Accordingly, the hose 10A has an inner base tube 12A, a braided reinforcing layer 11A comprised of aramid yarn 14A, a moisture impervious tubular film 13A bonded against the outside surface of the braid 11A and in the interstices between the individual yarns 14A of such braid, and a polymeric cover tube 16A extruded against the outside surface of the moisture impervious tubular film 13A. As described in connection with the hose 10, the film 13A isolates the aramid yarn 14A and results in a tubular zone between the braid 11A and the cover tube 16A which is free of moisture created bubbles.

In this disclosure of the invention each hose 10 and 10A is shown with a single layer of a tubular reinforcing braid; however, it will also be appreciated that instead of single layer of reinforcing braid around the base tube a plurality of such layers also made of aramid yarn may be provided. In this latter instance, a moisture impervious tubular film 13 may be disposed against the outside surface of each layer of reinforcing braid or against the outermost layer of reinforcing braid to thereby isolate the cover tube disposed concentrically outwardly of the braided layers from the influence of the aramid yarn layers.

The material employed in making each base tube 12 and 12A and each cover tube 16 and 16A may be any suitable polymeric material employed in the art for this purpose. Preferably each of such tubes is made of a suitable synthetic plastic material.

The aramid yarn 14 and 14A comprising each exemplary polymeric hose 10 and 10A respectively of this invention is preferably made from organic fibers within the family of aromatic polyamides. One example of a yarn that has been used successfully in hose constructions is sold by the E. I. DuPont de Nemours and Co. of Wilmington, Del., 19898 and sold under the registered trademark "KEVLAR".

The film 13 and 13A may be made employing any suitable material known in the art which will prevent aramid yarn from attracting water moisture thereto. An example of a material that has been used successfully is an acrylic latex applied in liquid form and ambient air dried to define a solid moisture impervious tubular film. An example of a film that has been used successfully is an acrylic latex manufactured by the Charles S. Tanner Co. of and sold under the trade designation of DURO CRYL 361.

However, it is to be understood that other materials may be used to define a moisture impervious polymeric film in addition to acrylic latex. For example, vinyl latex, vinylacrylic latex, vinylidene chloride latex, solvent cements from vinyl acetate, urethane, and the like may also be used.

While present exemplary embodiments of this invention, and methods of practicing the same have been illustrated and described, it will be recognized that this invention may be otherwise variously embodied and practiced within the scope of the following claims.

What is claimed is:

1. In a polymeric hose comprising an inner base tube, a reinforcing braid made of aramid yarn disposed concentrically around said base tube, said aramid yarn having great affinity for water, a polymeric cover tube, an adhesive layer disposed between said braid and said cover tube, said polymeric cover tube being disposed concentrically around said reinforcing braid and adhesive layer, the improvement comprising, a moisture-impervious tubular film disposed between said braid and said adhesive layer, said tubular film being bonded against said braid and in the interstices between individual yarns of said braid, said film isolating said aramid yarn and resulting in a tubular zone surrounding said braid and said tubular zone being surrounded by said adhesive layer and cover tube, said tubular zone being free of water moisture created bubbles.

2. In a hose as set forth in claim 1 the further improvement in which said adhesive layer is disposed against said tubular film, and said cover tube is disposed against said adhesive layer.

3. In a hose as set forth in claim 2 the further improvement in which said film is an acrylic latex film.

4. In a hose as set forth in claim 2 the further improvement in which said film is an acrylic latex film and said adhesive layer is a plastisol adhesive.

* * * * *